United States Patent [19]

McGough

[11] Patent Number: 5,058,966
[45] Date of Patent: Oct. 22, 1991

[54] VAULT LINER FOR USE IN COIN TELEPHONES

[75] Inventor: Gerald B. McGough, Huntsville, Ala.

[73] Assignee: Quadrum Telecommunications, Inc., Arab, Ala.

[21] Appl. No.: 640,267

[22] Filed: Jan. 11, 1991

[51] Int. Cl.$^5$ .................... H04M 17/00; A47B 88/00; G07B 17/00
[52] U.S. Cl. .................................... 312/319; 312/212; 232/15; 232/7; 232/43.2; 194/350; 379/143; 267/160; 109/45
[58] Field of Search ............... 312/212, 319; 248/346; 221/279, 50; 194/350; 109/47, 45; 232/7, 12, 93.2, 15, 16; 379/457, 440, 445, 441, 447, 451, 155, 143; 267/160

[56] References Cited

U.S. PATENT DOCUMENTS

| | | | |
|---|---|---|---|
| 1,259,153 | 3/1918 | Standish | 109/47 |
| 1,932,614 | 10/1933 | Bell | 232/15 |
| 2,483,805 | 10/1949 | Broussard | 232/16 |
| 3,846,594 | 11/1974 | Morrell | 379/451 |
| 3,851,942 | 12/1974 | Clay | 232/15 |
| 4,638,746 | 1/1987 | Ishigure | 232/15 |
| 4,896,826 | 1/1990 | Bernier | 232/16 |
| 4,928,299 | 5/1990 | Tansky | 379/143 |

FOREIGN PATENT DOCUMENTS 1145  6/1988  Japan .................... 379/143

*Primary Examiner*—Gary L. Smith
*Assistant Examiner*—Flemming Saether
*Attorney, Agent, or Firm*—Robert J. Black

[57] ABSTRACT

A plastic vault liner for use in paystations for the purpose of providing a spacer underneath the coin receptable. Two versions are shown: a standard one piece plastic version and a high security version which provides a stainless steel anti-drill plate as an integral part of the liner. The liner is designed as a bevel spring to insure positive upward pressure on various coin enclosures.

11 Claims, 2 Drawing Sheets

VAULT LINER FOR USE IN COIN TELEPHONES

BACKGROUND OF THE INVENTION

1. Field of the Invention

The present invention generally pertains to coin telephone (paystation) housings and more particularly to a liner which acts as a spacer to apply a positive upward force on the coin receptacle usually found inside of the lower paystation housing or vault portion.

2. Background of the Invention

Many paystation housings, particularly those manufactured by AT&T, Northern Telecom, and Palco Telecom Inc., require a vault liner, spring or combination which acts as a spacer to apply a positive upward force to operatively position the included coin receptacle in its proper location. Without such a device the coin receptacle self-locking lid arm would not properly engage the rail at the top of the vault and would not properly open. Furthermore, it would not be properly positioned to accept coins and thus may not self-lock as intended upon removal thereby creating a concern for security.

In the past, typically vault liners have been concave metal formed pieces shaped to fit the floor of the vault area with an associated spring eyeleted to the liner or vault floor. This spring provides the spacer with the necessary upward force required to properly position the coin receptacle. The liner itself was as a carrier for the spring and/or to prevent overflow coins from getting into cracks and crevices of the vault portion of the lower paystation housing. In the past, such liners were not user friendly inasmuch as they had sharp metal corners often cutting the fingers of coin collectors or servicemen. The included spring also presented an obstacle to access. The early design springs flattened out making the coin receptacle positioning extremely unreliable. Probably in response to the objection to finger cuts, etc., some later designs eliminated the metal liner altogether and merely eyeleted the spring directly to the bottom of the vault floor.

In recent times, a new problem has surfaced relating to vault security. Burglars have been drilling a large hole through the bottom of the paystation directly into the coin receptacle with a battery powered drill and removing the coins. In existing vault construction in most telephone paystations, the liners and springs provide an excellent pilot hole. These holes are intended to be used in eyeleting the coin receptacle spring to the vault base or liner. Thus providing a natural location for the burglar to start the hole through which the coin receptacle is accessed.

SUMMARY OF THE INVENTION

The present invention is a molded plastic piece generally square or rectangular in configuration and about ½ inch thick, properly sized to fit snugly into the paystation vault. The unit actually acts as a platform where the coin receptacle sits. The platform in accordance with the present invention has a slightly convex shaped top to act as a bevel spring. Included beneath the upper surface are internal ribs to keep the top from collapsing under high forces. The smooth top surface makes excess coin removal simple and the liner keeps coins from getting into cracks and crevices of the vault. The liner as designed provides for easy entrance and exit of the coin receptacle providing the other outlined advantages.

If desired, some of the material on the bottom side of the liner (the highest of the internal ribs) may be reduced in size to allow a flat metal plate to be attached to the underside of the liner. If the plate is made of stainless steel of heavy enough gauge, it would deter battery powered drills from drilling holes into the bottom of the coin receptacle, thus providing the necessary protection against burglary that has been found desirable in paystations installed in public areas where little or no security is present.

DESCRIPTION OF THE PREFERRED EMBODIMENT

Figure 1:
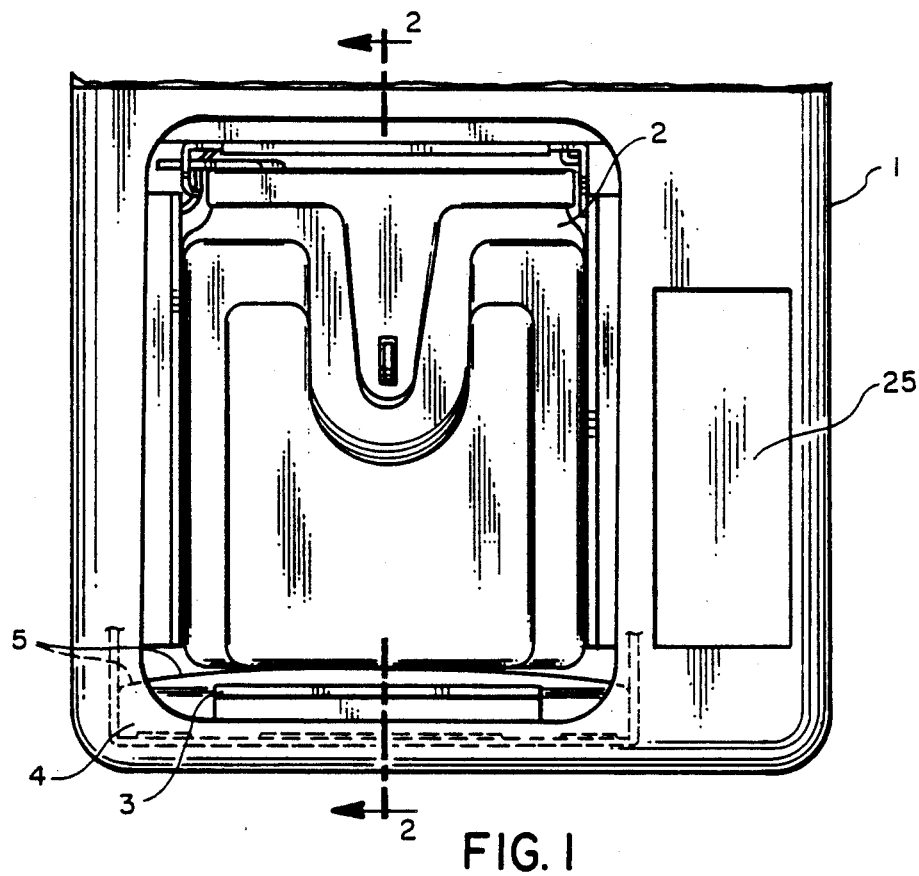
FIG. 1 is a front view of the lower housing or vault section of a telephone paystation with a coin receptacle shown in place over a vault liner (shown partially in phantom) in accordance with the present invention.
Figure 2:
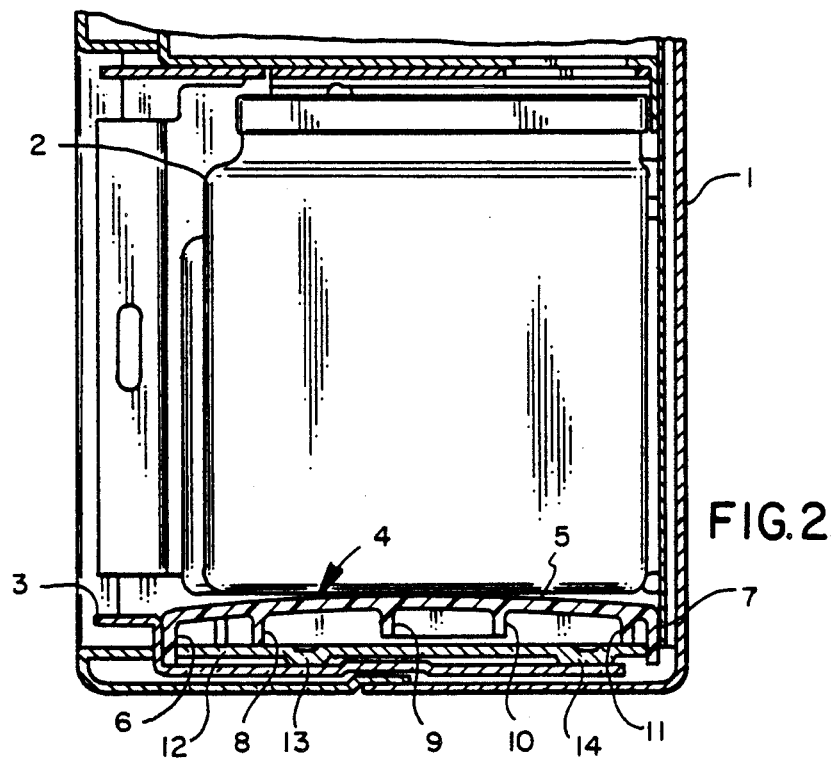
FIG. 2 is a cross-sectional view taken along lines 2—2 of FIG. 1 of the lower housing or vault portion of a telephone paystation showing a coin receptacle placed therein, on top of a plastic vault liner in accordance with the present invention and also showing a protective steel plate positioned below the vault liner.

Referring first to FIGS. 1 and 2, and the lower portion or vault section 1 of a telephone paystation is shown with a coin receptacle 2 positioned therein. The details of the coin enclosure 2 are not important inasmuch as they may vary from paystation to paystation (and do not form a part of the invention), therefore the specific details of the vault are not spelled out, it only being required that a top portion of the coin receptacle is forced up against the upper portion of the vault section and the bottom portion rests against some kind of a liner such as vault liner 4 that provides enough spring action to force the coin enclosure up against the top of the vault section. The top of the vault liner 4 must also be smooth to facilitate putting the coin enclosure into and out of the vault portion. As may be seen in both FIGS. 1 and 2, the vault liner 4 is placed over the lower or vault tray portion 3 which retains it in proper position.

As may be seen in FIG. 2, a steel plate 12 has been positioned below the vault liner 4 to discourage the drilling of holes directly into the coin enclosure from the bottom as is frequently attempted by burglars. The steel plate 12, usually constructed of heavy stainless steel, includes two features 13 and 14 or bosses (as well as features 15 and 16) which act as additional spacers to properly position the vault liner between the vault bottom and the coin enclosure bottom.

Figure 3:
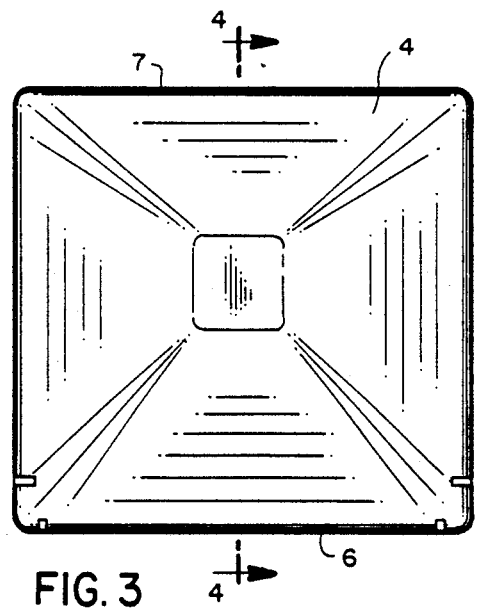
FIG. 3 is a top view of a vault liner in accordance with the present invention.
Figure 4:
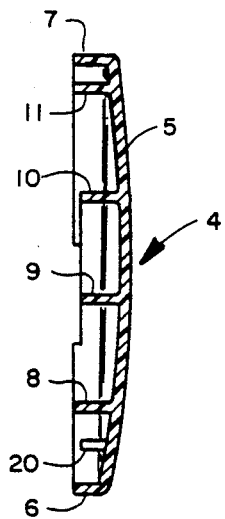
FIG. 4 is a cross-sectional view taken along lines 4—4 of FIG. 3 of a vault liner in accordance with the present invention.
Figure 5:
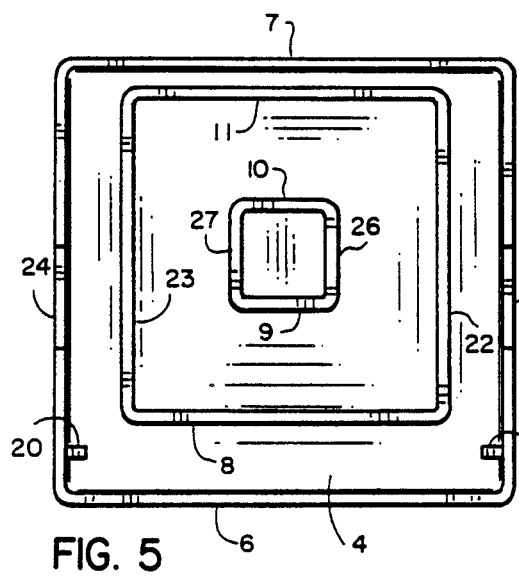
FIG. 5 is a bottom view of a vault liner in accordance with the present invention.

As may be seen in FIGS. 3, 4, and 5, the vault liner 4 has an upper or convex surface 5 which is smooth and characteristic to facilitate access and egress of the coin enclosure into the vault portion of the paystation telephone. Referring to the sectional drawing of FIG. 4 of the vault liner and also the bottom view FIG. 5, the upper surface of the platform of which the vault liner 4 consists has supporting it four edges 4, 7, 21, and 24. Also providing support for the upper surface or top portion of the vault liner are a number of ribs. The first group consisting of ribs 8, 11, 22, and 23 form a square. The second group consisting of ribs 9, 10, 26, and 27 forming a second group or a square within the concentric confines of previously outlined ribs and sides.

Referring to the sectional view of FIG. 4, it is noted that ribs 9 and 10 and their associated ribs 26 and 27 do not extend as far down as the ribs in the square consisting of ribs 8, 11, 22, and 23 which are the same length as the sides 6, 7, 21, and 24. The shorter ribs are provided so that a certain amount of compression can occur when the coin enclosure is positioned within the vault against the vault liner 4.

Figure 6:
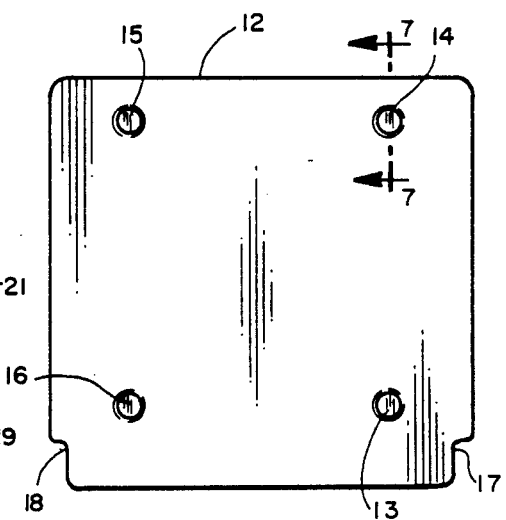
FIG. 6 is a bottom view of a steel security plate for placement below a vault liner in accordance with the terms of the present invention.
Figure 7:
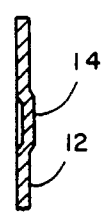
FIG. 7 is a partial cross-sectional view of a part of the steel plate of FIG. 6 taken along lines 7—7 showing embossed features or bosses that act as spacers.

Referring to FIGS. 2 and 6, where burglary is of concern, a stainless steel plate 12 is placed beneath the bottom of the vault liner. For this purpose, ribs 8, 11, 22, and 23 will all be shortened to allow the placement of the stainless steel plate. The plate is properly positioned when placed beneath the vault liner 4 and held in proper position by ribs 19 and 20 which can be seen in FIG. 5 and also seen in sectional view of FIG. 4 with cut out corners 17 and 18 of steel plate 12 as may be seen in FIG. 6. It was noted previously the steel plate 12 includes a number of projections, features, or bosses 13, 14, 15, and 16 to provide additional depth to the plate to provide the proper spacing of the vault liner within the vault so that the coin enclosure will be properly positioned against the top of the vault section of the coin telephone.

When the security plate use is desired, the internal ribs of the vault liner must be machined down to match the thickness of the plate. It is advantageous to adhesively bond the plate to the liner to become an assembly for easy insertion into the vault. The front corners of the plate 12 are notched not only to provide proper fit but also for clearance of the vault bar in certain paystation telephone vaults.

When the liner or liner assembly is placed within the paystation at the factory, it will be put into before the lock is positioned. The lock, after it is installed, will block unauthorized removal. Should it be desirable to place the liner or liner assembly in proper position within the paystation vault section in the field, the lock would normally prevent assembly. However, if prenotched corners 17 and 18 are removed with a cutting device, assembly will be possible. After this has been done, however, unauthorized removal will also be possible.

Once the liner is in place, coin receptacle insertion is identical to that found in previous designs. When the coin receptacle 2 is inserted, the center of the liner will be depressed such as found in a bevel spring and applies an upward positive force. As noted previously, ribs on the underside of the liner are concentric squares or rectangles as opposed to centrally radiating ribs thereby allowing the convex shape of the liner to elastically flex. It should also be noted that the ribs act as stops so that overflexing cannot result.

After the receptacle has been removed, the vault liner 4 acts as a smooth platform from which to receive any overflow coins that may be present within vault section of the coin telephone.

While but two embodiments of the present invention are shown, it will be obvious to those skilled in the art that numerous modifications could be made without departing from the spirit of the present invention which shall be limited only by scope of the claims appended hereto.

What is claimed is:

1. A liner for use in the vault portion of a coin telephone, said liner comprising:
   a substantially rectangular platform including a generally horizontally disposed top member presenting an upwardly facing flexible convex top surface;
   a plurality of integrally formed vertical support members depending from said top member;
   said liner operable to facilitate the manual placement of a coin receptacle into said vault portion and for applying pressure to said receptacle forcing it in an upward direction.

2. A liner as claimed in claim 1 wherein:
   said vertical support members include four side members each depending from an edge of said top member and each side member joined to at least one adjacent side member.

3. A liner as claimed in claim 2 wherein:
   said vertical support members further include a plurality of ribs.

4. A liner as claimed in claim 3 wherein:
   said ribs are arranged to form a plurality of concentric rectangles, surrounded by said members.

5. A liner as claimed in claim 4 wherein:
   a portion of said ribs are shorter than said side members.

6. A liner as claimed in claim 5 wherein:
   all of said ribs are shorter than said side members;
   and there is further included a horizontal metal plate positioned against a portion of said ribs and within said side members.

7. A liner as claimed in claim 6 wherein:
   said metal plate includes a plurality of spacers positioned to elevate said liner within said coin telephone vault portion.

8. A liner as claimed in claim 1 wherein:
   said liner is of plastic construction.

9. A liner as claimed in claim 6 wherein:
   there is further includes positioning members depending from said top member and adjacent to and integral with opposing side members;
   said positioning members assisting in the maintenance of said metal plate in proper position against said liner ribs.

10. A liner for use in the vault portion of a coin telephone, said liner comprising:
    a substantially square platform including a generally horizontally disposed top member presenting an upwardly facing flexible convex top surface;
    four side members each depending from an edge of said top member and each side member joined to at least one adjacent side member;
    a plurality of ribs forming vertical support members depending from said top member;
    ribs arranged to form a plurality of concentric circles surrounded by said side members;
    a portion of said ribs being shorter than said side members;

said liner constructed of plastic material.

11. A liner as claimed in claim 10 wherein:

all of said ribs are shorter than said side members and there is further included a horizontal metal plate positioned against said ribs and within said side members;

said metal plate including a plurality of spacers positioned to elevate said liner within said coin telephone vault portion;

and positioning members depending from said top member and adjacent to and integral with opposing side members;

said positioning members assisting in the maintenance of said metal plate and proper position against said liner ribs.

* * * * *